Aug. 31, 1954
H. WAGNER
2,687,654
SCREW AND NUT STEERING GEAR FOR MOTOR VEHICLES
Filed Aug. 13, 1951
Fig. 1
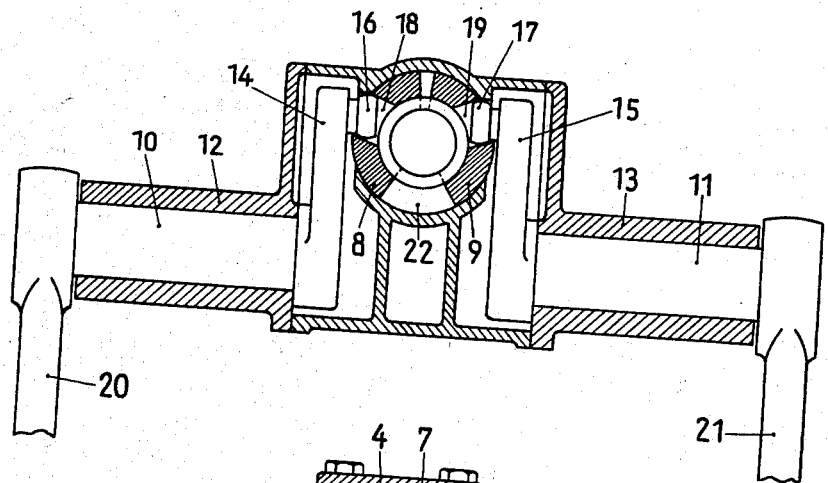
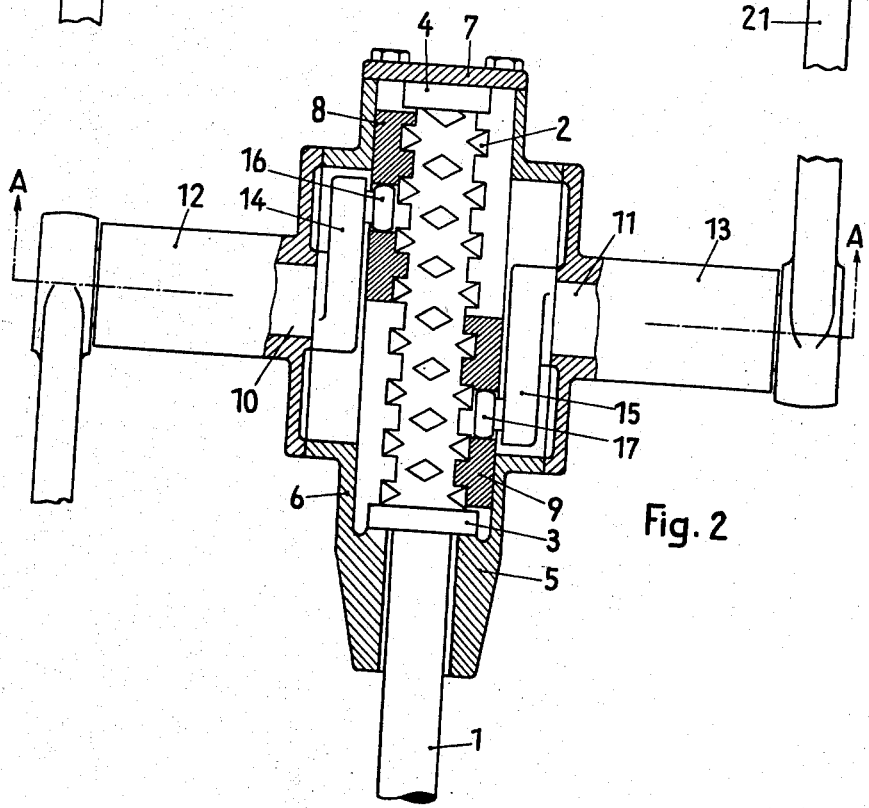
Fig. 2
Inventor:
HEINRICH WAGNER
By Edmund H. Parry
Attorney Patented Aug. 31, 1954

2,687,654

UNITED STATES PATENT OFFICE 2,687,654

SCREW AND NUT STEERING GEAR FOR MOTOR VEHICLES

Heinrich Wagner, Schwabisch-Gmund, Germany, assignor to Zahnradfabrik Friedrichshafen, Aktiengesellschaft, Friedrichshafen, Bodensee, Germany Application August 13, 1951, Serial No. 241,597

3 Claims. (Cl. 74—499)

My invention relates to a screw and nut steering gear for motor vehicles of such kind in which lateral swiveling of the vehicle wheels may be performed by two oppositely swingable steering lever arms and draw- and push-bars, and whereby said oppositely directed movements of the steering lever arms may be attained because their rockers are in engagement with segmental nut parts coacting with the left- and right-hand threaded end of the steering column. Steering arrangements of the aforesaid kind are known, but there the screw spindle is journalled in the housing of the steering gear and the segmental nut parts are only supported by the spindle. This arrangement has the drawback that the force coming from the segmental nuts and acting on the arms of the rocker shafts cannot act in the same plane as the force transmitted from the spindle to the segmental nuts. Consequently a one-sided tilting moment will arise which tends to push the segmental nut parts out of engagement. Hitherto this disadvantage could be avoided only by pressing the segmental nut parts continuously on the screw spindle.

My present invention aims at obviating this disadvantage, and to this end the segmental nut parts are exactly guided in a bore of the steering gear housing so that the tilting moment can not become effective in a disturbing manner. The segmental nut parts guided as pointed out above serve simultaneously as a particular exact bearing arrangement for the screw spindle so that other supporting means for the screw spindle are unnecessary. Another disadvantage of the hitherto known arrangements consists in that between each segmental nut part and the engaging pin of the rocker arm a slipping motion is inevitable which makes the operation of the steering gear very difficult. According to the present invention such slipping motion can not occur, since here the segmental nut parts are enabled to turn or partially rotate about the axis of the screw spindle in conformity with the movements of the rocker arms and each arm extends with a spherically shaped pin in a cylindrical bore of the nut part which bore is directed vertically to the axis of the screw spindle. This co-operation of the spherical pin and the cylindrical bore takes place without any disturbing clearance and therefore an accurate steering effect is attained over the entire range of the steering lock. The said pins are not separately produced and then fitted into the rocker arms but both parts form together one integral unit so that safety is increased.

Other features and advantages will be understood from the following description and are shown by way of example, diagrammatically.

Figure 1 shows a sectional view along line A—A of Figure 2 and

Figure 2 is a plan view in which some parts appear in section.

The left- and right-hand threaded screw spindle 2 and the steering column form one piece and are fixed against longitudinal movements by means of collars 3 and 4. Collar 3 abuts against the head piece 5 of the steering gear housing 6 while the collar 4 fits against the cover 7 of the housing 6. Two segmental nut parts 8 and 9 of hollow cylindrical section shape are guided in cylindrical bore 22, common to both nut parts. Across to the screw spindle 2 the rocker shafts 10 and 11 are supported by bearings 12 and 13, the latter being flanged to both sides of the housing 6 thereby fixing the rocker shafts 10 and 11 with their arms 14 and 15 against axial displacement. The rocker arms 14 and 15 carry spherically shaped pins 16 and 17, extending in bores 18 and 19 in the segmental nut parts 8 and 9, respectively. Bores 18 and 19 extend vertically to the axis of spindle 2. The pins 16, 17 are made integral with the rocker arms. The outer ends of the rocker shafts 10, 11 are provided with steering gear arms 20 and 21. The segmental nut part 8 is left hand threaded and the nut part 9 is right hand threaded. Rotation of the screw spindle 2 by means of the steering wheel in one or in the other direction will in each case cause axial displacement of the segmental nut parts 8 and 9 in opposite directions, and owing to the special engagement of the spherical pins 16 and 17 in the cylindrical apertures in the nut parts 8 and 9, the rocker shafts 10 and 11 are rotated so that the steering gear arms 20 and 21 are moved in opposite directions to each other. While the pins 16 and 17 move on a circular path, the segmental nut parts 8 and 9 will perform a slight rotation in bore 22 of housing 6 which ensures in all ranges of the steering lock a correct driving connection of all parts, without any disturbing clearance between the segmental nut parts and rocker arms respectively.

I do not want to be limited to the details described or shown in the drawings as many variations will occur to those skilled in the art.

What I claim is:

1. A screw and nut steering gear for motor vehicles, comprising a steering column the end of which is left and right hand threaded and fixed against longitudinal displacement in a steering gear housing, two segmental nut parts of hollow cylindrical sectional shape, one of which is provided with a left hand interior thread and the other with a right hand interior thread, said two segmental nut parts engaging the threaded end of the steering column in radial and axial opposition to each other in the steering gear housing, a cylindrical guide bore in said housing common to both segmental nut parts and supporting same for axial and rotatable displacement in said bore, the segmental nut parts supporting the threaded end of the steering column, two transverse rocker shafts journaled in the steering gear housing and having rocker arms thereon, pins on the rocker arms engaged in apertures in the segmental nut parts, and steering gear arms fixed to the rocker shafts.

2. A screw and nut steering gear for motor vehicles, comprising a steering column the end of which is left and right hand threaded and fixed against longitudinal displacement in a steering gear housing, two segmental nut parts of hollow cylindrical sectional shape, one of which is provided with a left hand interior thread and the other with a right hand interior thread, said two segmental nut parts engaging the threaded end of the steering column in radial and axial opposition to each other in the steering gear housing, a cylindrical guide bore in said housing common to both segmental nut parts and supporting same for axial and rotatable displacement in said bore, the segmental nut parts supporting the threaded end of the steering column, two transverse rocker shafts journaled in the steering gear housing and having rocker arms thereon, spherically shaped pins on the rocker arms engaged in cylindrical bores in the segmental nut parts, said cylindrical bores extending in a vertical direction with respect to the axis of the screw, and steering gear arms fixed to the rocker shafts.

3. A screw and nut steering gear for motor vehicles, comprising a steering column the end of which is left and right hand threaded and fixed against longitudinal displacement in a steering gear housing, two segmental nut parts of hollow cylindrical sectional shape, one of which is provided with a left hand interior thread and the other with a right hand interior thread, said two segmental nut parts engaging the threaded end of the steering column in radial and axial opposition to each other in the steering gear housing, a cylindrical guide bore in said housing common to both segmental nut parts and supporting same for axial and rotatable displacement in said bore, the segmental nut parts supporting the threaded end of the steering column, two transverse rocker shafts journaled in the steering gear housing and having rocker arms thereon, spherically shaped pins integral with the rocker arms engaged in cylindrical bores in the segmental nut parts, said cylindrical bores extending in a vertical direction with respect to the axis of the screw, and steering gear arms fixed to the rocker shafts References Cited in the file of this patent

UNITED STATES PATENTS

| Number | Name | Date |
| --- | --- | --- |
| 851,534 | Lewis | Apr. 23, 1907 |
| 883,179 | Ditwiler | Mar. 31, 1908 |
| 1,251,111 | Ruegamer | Dec. 25, 1917 |
| 1,368,044 | Murnane | Feb. 8, 1921 |
| 1,393,981 | Spence | Oct. 18, 1921 |
| 1,607,483 | Scharf et al. | Nov. 16, 1926 |
| 1,723,537 | Wright | Aug. 6, 1929 |
| 2,274,821 | Bloxsom | Mar. 3, 1942 |